Dec. 9, 1969    J. A. ROBERTS ET AL    3,482,703
PARTICULATE AND BIOLOGICAL FILTERS
Filed Jan. 30, 1968
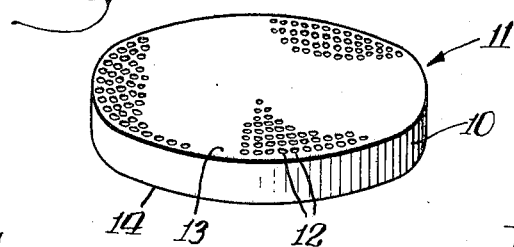
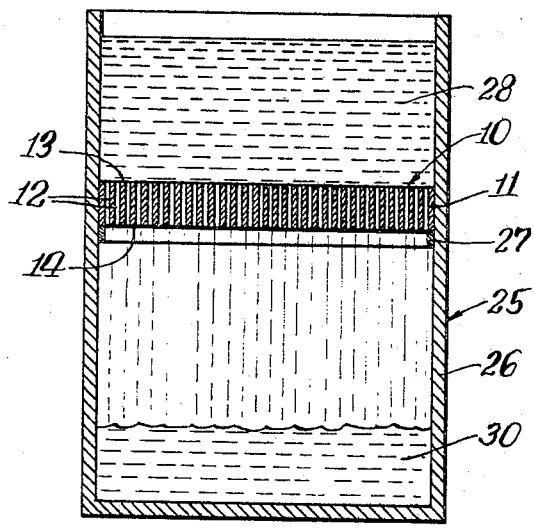
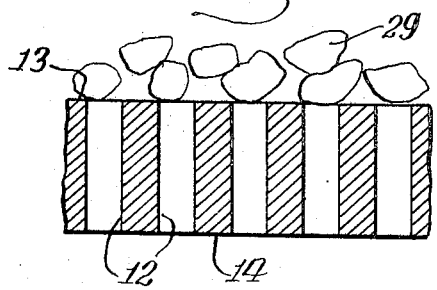
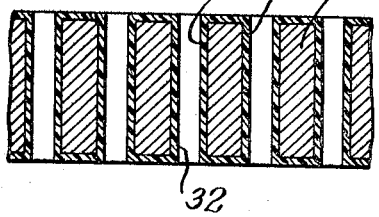
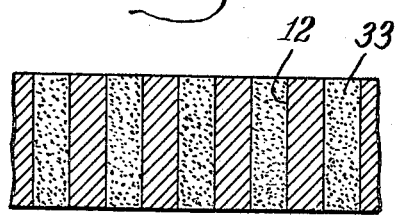
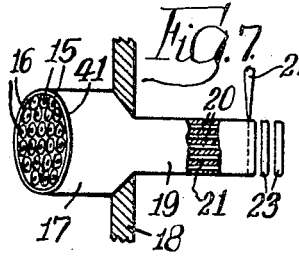
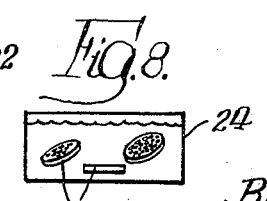
Inventors:—
John A. Roberts,
Norman F. Surprenant
By Hofgren, Wegner, Allen,
Stellman & McCord Attys.

United States Patent Office 3,482,703
Patented Dec. 9, 1969

3,482,703
PARTICULATE AND BIOLOGICAL FILTERS
John A. Roberts, North Chelmsford, and Norman F. Surprenant, Littleton, Mass., assignors to Brunswick Corporation, a corporation of Delaware
Filed Jan. 30, 1968, Ser. No. 701,777
Int. Cl. B01d *39/20*
U.S. Cl. 210—489     28 Claims

ABSTRACT OF THE DISCLOSURE

A micro-filter for filtering extremely small particulate and biological matter from a fluid. The micro-filter comprises a collimated hole structure having extremely small passages therethrough. To provide reduced cross sectional dimensions, means are provided on the collimated hole structure for further reducing the effective cross section of the passages. The cross section reducing means include a layer of material on the collimated hole structure extending partially into the passages, particulate material deposited within the passages and plating on the surfaces of the collimated hole structure. The collimated hole structure may be formed of high temperature and corrosion resistant material such as a metal. The passages may be substantially rectilinear for facilitated fluid flow and maintenance.

---

This invention relates to filters and in particular to micro-filters adapted for filtering extremely small particulate and biological matter.

A number of devices are presently known for filtering particles of under approximately 10 microns. One such filter comprises a mixture of cellulose esters providing a plurality of somewhat tortuous flow paths having controlled cross sectional dimensions of from approximately 10 microns to approximately $\frac{1}{100}$ micron. However, such organic plastic filters are relatively low in strength and require support to withstand relatively high pressure differentials thereacross without significant deformation of the pore structure. Such filters further tend to clog relatively quickly and are not adapted for reuse. Such filters have a relatively low resistance to temperature and are susceptible to many organic materials and alkalies.

The present invention comprehends an improved filter for filtering particulate and biological material such as having maximum cross sectional dimensions of under approximately 10 microns which eliminates the disadvantages of the above discussed known micro-filter in a novel and simple manner. More specifically, the present invention comprehends an improved micro-filter comprising a collimated hole structure wherein a body of relatively rigid material such as metal is provided with a plurality of through passages having a maximum effective cross section of under approximately 10 microns. The micro-filter is extremely simple and economical of construction and may be readily reused by suitable back flushing. The material of which the micro-filter is formed may be preselected to provide desired high temperature and anti-corrosion characteristics.

Thus, a principal feature of the present invention is the provision of a new and improved micro-filter.

Another feature of the invention is the provision of such a micro-filter defined by a collimated hole structure defining a pair of spaced surfaces and a plurality of substantially rectilinear passages opening therethrough for passing a fluid through the structure, the passages having a maximum effective cross section of under approximately 10 microns for filtering from the fluid particles having a maximum transverse dimension smaller than the effective passage cross section.

A further feature of the invention is the provision of such a micro-filter wherein the passages are substantially rectilinear.

Still another feature of the invention is the provision of such a micro-filter wherein the passages have a generally elliptical cross section.

A still further feature of the invention is the provision of such a micro-filter wherein the passages occupy at least approximately 50% of the cross section of the collimated hole structure.

Yet another feature of the invention is the provision of such a micro-filter wherein the collimated hole structure has a small aspect ratio of length to cross section.

A yet further feature of the invention is the provision of such a micro-filter wherein the collimated hole structure is formed of metal.

A further feature of the invention is the provision of such a micro-filter wherein the collimated hole structure is formed of a rigid material capable of withstanding at least 5000 p.s.i.d. between the surfaces without permanent deformation thereof.

Still another feature of the invention is the provision of such a micro-filter wherein the collimated hole structure has a thickness of under 500 microns.

A still further feature of the invention is the provision of such a micro-filter wherein the passages are provided in a substantially uniform pattern across the collimated hole structure.

Yet another feature of the invention is the provision of such a micro-filter wherein the passages are of similar cross section.

A yet further feature of the invention is the provision of such a micro-filter wherein the passages have a uniformity of cross section of greater than approximately plus or minus 5%.

Another feature of the invention is the provision of such a micro-filter defined by a collimated hole structure defining a pair of spaced surfaces and a plurality of passages opening therethrough for passing a fluid through the structure, the passages having a maximum cross section of under approximately 25 microns, and means carried by the structure for decreasing the effective cross section of said passages to under approximately 10 microns to filter from said fluid particles having a maximum transverse dimension smaller than the effective passage cross section.

Still another feature of the invention is the provision of such a micro-filter wherein the cross section decreasing means comprises particulate means deposited in the passages providing a tortuous flow path through the interstices thereof.

A still further feature of the invention is the provision of such a micro-filter wherein the cross section decreasing means comprises a layer of material on at least one of the surfaces extending partially across the passages at the opening thereof into the one surface.

Yet another feature of the invention is the provision of such a micro-filter wherein the layer is plated on the collimated hole structure.

A yet further feature of the invention is the provision of such a micro-filter wherein the cross section decreasing means comprises a plastic coating on the collimated hole structure.

A further feature of the invention is the provision of such a micro-filter wherein the cross section decreasing means comprises a high temperature resistant means.

Still another feature of the invention is the provision of such a micro-filter wherein the cross section decreasing means comprises a corrosion resistant means.

A still further feature of the invention is the provision of such a micro-filter wherein the cross section decreasing means is disposed substantially only at the opening of the passages into one or both of said surfaces.

Other features and advantages of the invention will be apparent from the following description taken in connection with the accompanying drawing wherein:

FIGURE 1 is a perspective view of a micro-filter embodying the invention;

FIGURE 2 is a vertical section of a filter apparatus wherein the micro-filter is utilized for filtering particulate material from a fluid;

FIGURE 3 is an enlarged fragmentary diametric section illustrating the filtering action thereof;

FIGURE 4 is an enlarged fragmentary diametric section of a modified form of micro-filter embodying the invention;

FIGURE 5 is an enlarged fragmentary diametric section of another form of micro-filter embodying the invention;

FIGURE 6 is an enlarged fragmentary diametric section of still another form of micro-filter embodying the invention;

FIGURE 7 is a schematic elevation illustrating a method of forming a composite suitable for use in manufacture of the micro-filter; and FIGURE 8 is a schematic elevation illustrating a further forming step.

In the exemplary embodiment of the invention as disclosed in the drawing, a micro-filter generally designated 11 is shown to comprise a collimated hole structure 10 having a plurality of through passages 12 opening through a first surface 13 and a spaced opposite surface 14. The passages 12 are formed with extremely small maximum cross sections which illustratively may be under approximately 25 microns and which may be less than one micron as desired. The collimated hole structures are preferably formed by an improved method such as disclosed in copending Roberts and Roberts U.S. application for Letters Patent Ser. No. 471,123, filed July 12, 1965, now abandoned, said application being refiled as a continuation-in-part application, Ser. No. 778,679, filed Nov. 25, 1968 for a passage structure and owned by the assignee hereof. Reference may be had to said application for a complete description of the improved forming method. However, for purposes of understanding the present invention, reference may be had to FIGURES 7 and 8 wherein the collimated hole structures are shown to be formed by firstly bundling a plurality of rods 15 sheathed in tubular sheath 16 and constricting the bundle 17 as by drawing the same through conventional dies 18. The constricting operation may be conducted in a number of passes to provide a final composite 19 wherein the rods define extremely fine filaments 20 and the sheaths 16 define a substantially monolithic matrix body 21 in which the filaments 20 are distributed in parallel relationship. If desired, the bundle 17 may include an outer sheath 41 which may be formed of the same material as the sheaths 16 and which thus unifies with the sheath 16 to form the outer portion of the monolithic matrix 21. The composite 19 may be transversely cut by suitable means such as a conventional knife 22 into a plurality of small disc-like elements 23. The elements 23 may be suitably treated to remove the filament 20 material such as by treatment with a suitable leaching acid in a conventional leaching tank 24 as shown in FIGURE 8. Resultingly the leaching of the filaments leaves through passages in the elements 23 which define the passages 12 in the matrix body 21 of the collimated hole structure 10 shown in FIGURE 1. As the rods 15 and sheath 16 may be suitably selected for size, distribution, material characteristics, and the like, and the constricting operations may be accurately controlled to provide relatively uniform cross section filaments 20 of accurately controlled cross sectional dimensions, high accuracy and desirable physiochemical characteristics are readily obtained in the collimated hole structure while at relatively low cost. Illustratively, the rods 15 may be formed of Monel metal and the sheaths 16 and 41 formed of stainless steel whereby the collimated hole structure 10 will comprise a stainless steel multi-passage body with the Monel metal being removed by nitric acid in the tank 24 as illustrated in FIGURE 8. The composite 19 may be re-bundled if desired to provide further constriction thereof by repeating the process illustrated in FIGURE 7 so that the four sides of the collimated hole structure may be made effectively as small as desired while yet the passages may have accurately controlled dimensions and configurations. It has been found that the passages 12 have slightly elliptical cross sections, although they are generally circular. Further, the elements 23 may be cut extremely thin for improved filtering action as it has been further found that in such micro-filter structures the filtering action is effectively limited to the upstream surface as illustrated in FIGURE 3 and thus the use of extremely thin micro-filter structures is desirable for effectively minimizing pressure drops therethrough. Still further, as the sheaths 16 may be made relatively thin, the collimated hole structure 10 may be made extremely porous with only a minimum amount of metal defining the webs between the passages sufficient to provide the desired strength and resistance to pressure.

Illustratively, the pressure drop across such a micro-filter where the flow therethrough is considered to be laminar, as occurs in capillary passages, is directly related to the viscosity of the fluid, the length of the passages and the average velocity of the flow through the passages and inversely related to the square of the passage diameter. Thus for extremely small passage diameter it is desirable to minimize the length of the passages as much as possible for minimum pressure drop. The use of the rigid metallic matrix 21 permits such extremely small thicknesses in the filter for improved filtering flow. The relatively strong metal matrix body permits relatively high pressure differentials thereacross which may be over 200 p.s.i.d. and as high as approximately 5000 p.s.i.d.

Another highly desirable feature of the collimated hole structure 10 is the uniformity of passage cross section which may be obtained by the disclosed method of formation. Thus, for example, where the passage cross section is approximately .5 micron, the uniformity of passage size may be plus or minus approximately 5%.

Referring now to FIGURE 2, the collimated hole structure 10 may be utilized in a filtering apparatus generally designated 25 wherein a tank 26 is provided with an annular support 27 on which the collimated hole structure 10 is disposed for passing downwardly through the passages 12 thereof a fluid 28 which may contain particulate material such as material 29 shown in FIGURE 3. The particulate material will be filtered from the liquid which may be then collected as a filtrate 30 in the lower portion of the tank 26. While the illustration of the use of the collimated hole structure is one wherein the liquid passes through the filter by gravitational means, it will be understood by those skilled in the art that the filter may be employed in filtering systems wherein the fluid is delivered under substantial pressures through the micro-filter. As shown in FIGURE 3 and as discussed briefly above, the particulate material 29 tends to collect on the upstream surface 13 of the micro-filter. However, because of the substantial porosity of the micro-filter, a substantial amount of such particulate material may be collected before the passages 12 are blocked thereby. As the material tends to collect at a substantial planar surface 13, the filter may be readily cleaned by back flushing for subsequent reuse. Further, as the filter may be formed of a temperature resistant material such as stainless steel, the filter may be autoclaved or similarly sterilized where the filter is used for bacteriological filtering purposes. Further, as the passages 12 are substantially rectilinear, the flow resistance is effectively minimized and the back flushing of the filter is effectively facilitated.

The invention further comprehends a further reduction in the effective filter pore size of the collimated hole structure by providing means thereon for further reducing the cross section of at least a portion of the flow passages. As shown in FIGURE 4 of the drawing, a plastic coating 31 may be applied to the matrix 21 which resultingly makes the size of the resultant flow passages 32 correspondingly smaller than the original passages 12. As the thickness of the coating may be readily controlled by conventional plastic coating techniques, highly accurate control of the resultant passage 32 cross sectional dimensions may be obtained. Illustratively, the plastic coating may comprise a Teflon (polytetrafluoroethylene) coating providing the highly desirable advantages of high corrosion resistance and low friction. As the plastic coating is carried on the relatively rigid and strong metal matrix body 21, the plastic coated structure similarly comprises a strong micro-filter capable of withstanding extremely high pressures without deformation.

Further alternatively, a reduction in the effective pore size of the filter may be obtained by filling the passages 12 with suitable powder material 33. Illustratively, the material 33 may comprise metallic powder retained in the passages 12 by suitable bonding such as by sintering.

In such micro-filters, the resistance to flow of the fluid through the passages is inversely proportional to the fourth power of the diameter of the passages. Thus, as the pore size is decreased, substantial resistance to flow therethrough results. Illustratively, a reduction in diameter from 4 microns to ½ micron increases the flow resistance by approximately 4000 times. The invention further comprehends an improved structure which, while reducing the pore size, avoids the undesirable flow resistance increase in a novel and simple manner. Thus, as shown in FIGURE 6, a layer 34 may be provided on the upper surface 13 which extends somewhat into the passages 12 at the upper surface to define an annular lip 35 providing a reduced diameter of the passages at this position. The layer 34 may be formed by electrodeposition of a suitable metal. It has been found that with such small passage structures the lips 35 form at the surface and that a smaller thickness of the plated metal is provided within the passages 12. Thus, over a substantial portion of the resultant smaller diameter passages 36 the diameter is substantially larger than the diameter defined by the annular lips 35. Resultingly the increase in flow resistance is effectively minimized while yet the effective pore size as seen by the particles at the upstream surface is effectively minimum. In the embodiment illustrated in FIGURE 6, the plating is applied to all surfaces of the collimated hole structure. If desired, further advantage of the non-uniform plating characteristic may be utilized by coating the lower surface 14 with a suitable plate-resist material so that the plating will be effected only at the surface 13 portion. The plating is positively bonded to the metallic matrix 13 to provide a strong corrosion and temperature resistant surface. Again, as the particulate material is effectively retained on the upstream surface of the micro-filter, facilitated maintenance as by back flushing is provided.

Thus, the present invention comprehends an improved micro-filter wherein high strength, low flow resistance, and uniform filtering action may be obtained. A high degree of accuracy in the pore size may be readily obtained at low cost. Further the micro-filter may be reused and thus provides extremely long life.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A micro-filter comprising: a collimated hole structure defining a pair of spaced surfaces and a plurality of passages opening therethrough for passing a fluid through said structure, said passages having a maximum cross section of under approximately 25 microns; and means carried by said structure for decreasing the effective cross section of said passages to under approximately 10 microns to filter from said fluid particles having a maximum transverse dimension smaller than said effective passage cross section.

2. The micro-filter of claim 1 wherein said cross section decreasing means comprises particulate means deposited in said passages providing a tortuous flow path through the interstices thereof.

3. The micro-filter of claim 1 wherein said cross section decreasing means comprises a layer of material on at least one of said surfaces extending partially across said passages at the opening thereof into said one surface.

4. The micro-filter of claim 1 wherein said cross section decreasing means comprises a layer of material plated on at least one of said surfaces extending partially across said passages at the opening thereof into said one surface.

5. The micro-filter of claim 4 wherein said plated material extends into said passages at said opening thereof into said one surface.

6. The micro-filter of claim 1 wherein said cross section decreasing means comprises means reducing the effective cross section to less than approximately 1 micron.

7. The micro-filter of claim 1 wherein said cross section decreasing means comprises metallic material bonded to said collimated hole structure.

8. The micro-filter of claim 1 wherein said cross section decreasing means comprises plastic material bonded to said collimated hole structure.

9. The micro-filter of claim 1 wherein said cross section decreasing means comprises a Teflon coating.

10. The micro-filter of claim 1 wherein said cross section decreasing means comprises a high temperature resistant means for permitting thermal sterilization thereof.

11. The micro-filter of claim 1 wherein said cross section decreasing means comprises a corrosion resistant means for permitting chemical sterilization thereof.

12. The micro-filter of claim 1 wherein said cross section decreasing means comprises an electroplated layer.

13. The micro-filter of claim 1 wherein said cross section decreasing means comprises means extending partially across said passages substantially only at the opening thereof into said surfaces.

14. The micro-filter of claim 1 wherein said cross section decreasing means comprises means extending partially across said passages substantially only at the opening thereof into one of said surfaces.

15. A micro-filter comprising a collimated hole structure defining a pair of spaced surfaces and a plurality of substantially rectilinear passages opening therethrough for passing a fluid through said structure, said passages having a maximum effective cross section of under approximately 10 microns for filtering from said fluid particles having a maximum transverse dimension smaller than said effective passage cross section.

16. The micro-filter of claim 15 wherein said passages are substantially rectilinear.

17. The micro-filter of claim 15 wherein said passages have a generally elliptical cross section.

18. The micro-filter of claim 15 wherein said passages occupy at least approximately 50% of the cross section of said collimated hole structure.

19. The micro-filter of claim 15 wherein said collimated hole structure has a small aspect ratio.

20. The micro-filter of claim 15 wherein said collimated hole structure is formed of metal.

21. The micro-filter of claim 15 wherein said collimated hole structure is formed of a rigid material capable of withstanding at least 200 p.s.i.d. between said surfaces without permanent deformation thereof.

22. The micro-filter of claim 15 wherein said collimated hole structure is formed of a rigid material capable of withstanding at least 5000 p.s.i.d. between said surfaces without permanent deformation thereof.

23. The micro-filter of claim 15 wherein said collimated hole structure comprises a thin metal disc.

24. The micro-filter of claim 15 wherein said collimated hole structure has a thickness of under 500 microns.

25. The micro-filter of claim 15 wherein said passages are provided in a substantially uniform pattern across said collimated hole structure.

26. The micro-filter of claim 15 wherein said passages have similar cross sections.

27. The micro-filter of claim 15 wherein said passages have a uniformity of cross section of greater than approximately plus or minus 5%.

28. The micro-filter of claim 15 wherein said collimated hole structure is formed of stainless steel.

References Cited

UNITED STATES PATENTS

| | | | |
|---|---|---|---|
| 87,385 | 3/1869 | Winchester | 210—498 |
| 2,267,752 | 12/1941 | Ruska et al. | 210—498 X |
| 2,345,080 | 3/1944 | Ardenne | 210—498 X |
| 3,359,192 | 12/1967 | Heinrich et al. | 210—498 X |

REUBEN FRIEDMAN, Primary Examiner

J. W. ADEE, Assistant Examiner

U.S. Cl. X.R.

210—498, 506, 510